Dec. 1, 1970  H. A. ELLIOTT  3,544,800
OPTICAL APPARATUS FOR ENCODING ANGULAR MOVEMENT
OF A ROTATING SHAFT
Filed Nov. 20, 1968  2 Sheets-Sheet 1
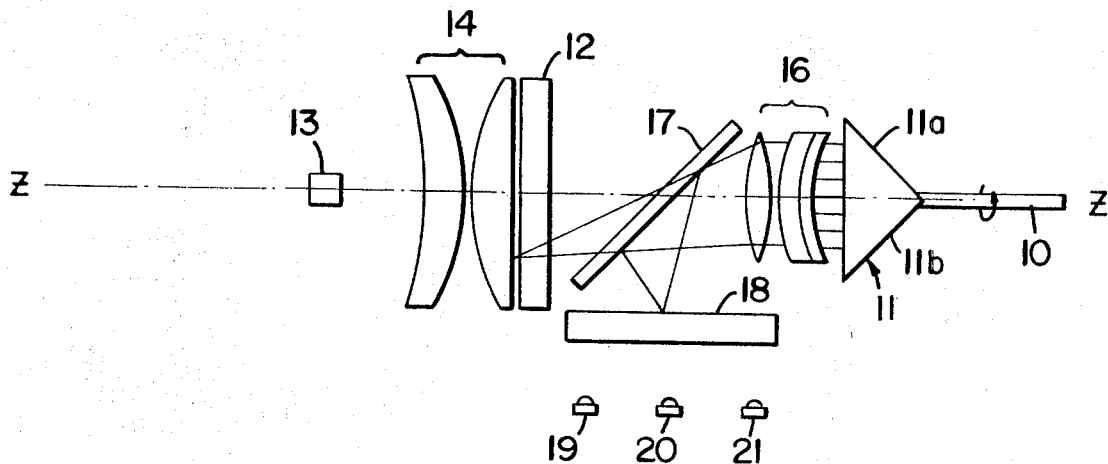
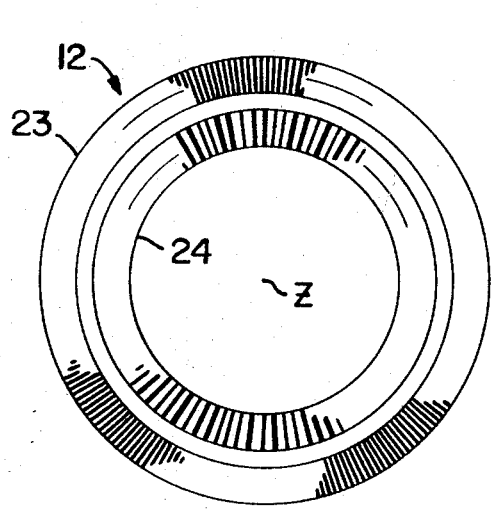
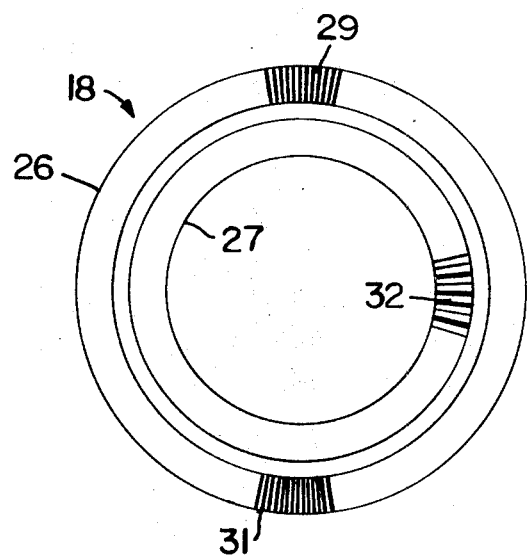
FIG_2  FIG_3
INVENTOR.
HAROLD A. ELLIOTT
BY
ATTORNEYS

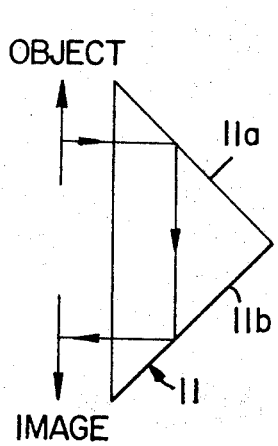
FIG_4A
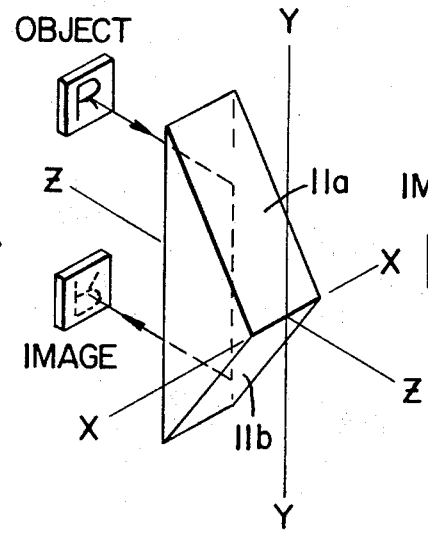
FIG_4B
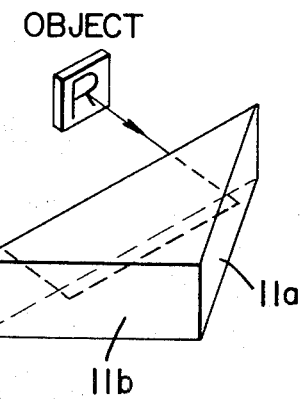
FIG_4C
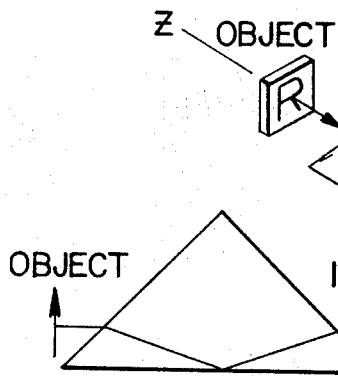
FIG_5A
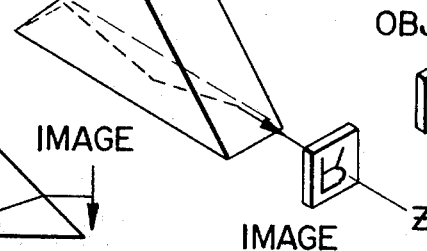
FIG_5B
FIG_5C
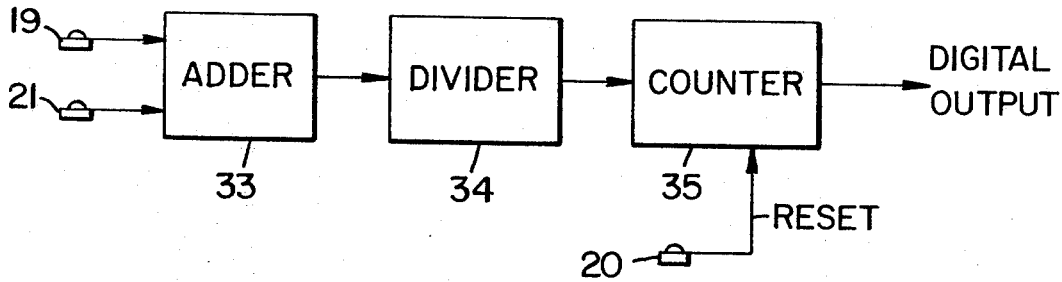
FIG_6

United States Patent Office 3,544,800
Patented Dec. 1, 1970

3,544,800
OPTICAL APPARATUS FOR ENCODING ANGULAR MOVEMENT OF A ROTATING SHAFT
Harold A. Elliott, Woodside, Calif., assignor to Quantic Industries, Inc., San Carlos, Calif., a corporation of California
Filed Nov. 20, 1968, Ser. No. 777,311
Int. Cl. G01d 1/26, 5/34
U.S. Cl. 250—231                                                  11 Claims

ABSTRACT OF THE DISCLOSURE

Optical apparatus for digitally encoding the angular movement of a rotating shaft in which a 45°–90°–45° prism is mounted on the shaft for rotating any image projected on the hypotenuse of the prism. Such image is provided by primary counting and reference masks, the reflected image from the prism being imaged on secondary counting and reference masks having a coded pattern to provide a digital output indicating shaft rotation.

BACKGROUND OF THE INVENTION

The present invention relates to optical apparatus for sensing angular motion and more specifically to an encoder for indicating the rotational position of a shaft relative to a fixed reference and to express that position in a digital manner.

Present optical encoders normally include a disk which is mounted on a shaft which has a code in the form of slits. The coded disk is illuminated from behind and in conjunction with a reference stator also having slits provides a digital indication of the shaft position.

It has been found in practice that frequently mechanical elements cause deviations of the disk from its true position and thus produce errors in output readings. In addition to the inherent eccentricity or wobble of the shaft, the disk, being mounted on the shaft, itself causes an additional load and thus increases errors.

As an example of error due to shaft eccentricity, if the shaft bearing has a run out amounting to an eccentricity of 0.002 inch, such eccentricity can readily produce as much as one quantum of error in the final digital output, where quantum is defined as the angular space representative of a single digit. If it is desired to reduce the error to one-half this value, the run out must be reduced by one-half. However, a bearing of this precision might readily cost ten times as much. It is apparent that it would not be economically or commercially feasible to use bearings of such extreme precision.

Another difficulty with present angular position indicators is that where an optical lens is used in the system, lens distortion must be reduced to a minimum necessitating relatively expensive compound lens.

Present commercial encoders are also sensitive to translational displacements of the shaft along its axis.

OBJECTS AND SUMMARY OF THE INVENTION

It is therefore a general object of the present invention to provide an improved optical apparatus for sensing the angular motion of a rotating object.

It is another object of the invention to provide apparatus as above which is independent of or unaffected by lens distortion in the system.

It is another object of the invention to provide apparatus as above which is insensitive to mechanical deficiencies in the rotating shaft being measured.

It is another object of the invention to provide optical apparatus as above in which no code disk need be mounted for rotation on a rotating shaft.

In accordance with the above objects there is provided optical apparatus for sensing the angular motion of a rotating object having a predetermined axis of rotation. It includes optical means of the image rotator type having a predetermined axis of rotation adapted for coupling to the rotating object with both of the axes coincident. A primary mask having a predetermined code is spaced from and faces the optical means. Illumination means projects the code pattern towards the optical means. A secondary mask having a predetermined code pattern is spaced from and faces the optical means so that the projected pattern of the primary mask is superimposed on the secondary mask pattern whereby a pattern is detectable behind the secondary mask. The patterns of said primary and secondary masks are arranged so that the detectable pattern is indicative of the angular motion of the rotating object.

BRIEF DESCRIPTION OF THE DRAWING

FIG. 1 is a diagrammatic representation of the optical apparatus embodying the present invention;

FIG. 2 is an elevation view of a primary mask used in FIG. 1;

FIG. 3 is an elevation view of a secondary mask used in FIG. 1;

FIGS. 4A, 4B and 4C are an elevation and perspective views of an optical prism used in the present invention illustrating its functioning;

FIGS. 5A, 5B and 5C are elevation and perspective views of the prism shown in FIGS. 4A through 4C but in an alternative mode of usage;

FIG. 6 is a block diagram of an electrical circuit used in conjunction with FIG. 1.

DETAILED DESCRIPTION OF THE INVENTION

Referring first to FIG. 1, the object of the present invention is to sense or measure the angular motion of a shaft 10 rotating in the direction as shown by the arrow. This has an axis of rotation designated Z. Attached to the end of shaft 10 in a suitable manner is a prism 11 which is preferably of the Porro type which is essentially a 45°–90°–45° prism. Prism 11 is being used as a double mirror system as will be discussed in conjunction with FIGS. 4 and 5 which has the ability to rotate an image. Faces 11a and 11b of prism 11 are coated to cause reflection.

A slitted primary mask 12 as best shown in FIG. 2 is spaced from and faces the hypotenuse of prism 11 and is illuminated from behind by a suitable light source 13. The compound condensing lens 14 provides suitable illumination over all of the desired areas of mask 12. Mask 12 is coded with a predetermined pattern of slits as will be discussed below creating a pattern which is projected by a compound objective lens 16 towards prism 11. Alternatively the light source may face the primary mask for allowing a reflected code pattern to be projected.

A beam splitter in the form of a tilted half silvered mirror 17 is placed on the Z axis and while allowing a portion of the beam pattern of mask 12 to be projected towards prism 11 reflects a portion of the light reflected from prism 11 onto a secondary mask 18. This mask is best shown in FIG. 3 and includes a slitted code pattern behind which are located detectors 19, 20 and 21.

The primary mask pattern as shown in FIG. 2 consists of two concentric rings 23 and 24 with the outer ring being used for providing signals representing shaft rotation increments and the inner ring 24 providing a reference point. The secondary mask 18 of FIG. 3 consists of corresponding outer and inner rings 26 and 27. Ring 26 has two identical slitted mask portions 29 and 31 which are located 180° opposite each other and are used for the incremental shaft rotation function. Inner ring 27 includes a sector 32 which in conjunction with the ring 24 provides a reference point signal.

The masks 12 and 18 function in the same manner as disclosed and claimed in a copending application in the name of Sheldon A. Knight, entitled "Apparauts for Tracking an Infrared Radiation Gradient and Readout Means Therefor," Ser. No. 474,613, filed July 26, 1965 and now Pat. No. 3,495,085. More particularly, the primary counting mask 23 as disclosed in the copending application comprises a series of transparent bars or slits and alternate opaque bars. Secondary counting mask portions 29 and 31 are similar and consist of bars and slits. However, the secondary counting masks have a slightly different density of opaque bars per inch. For example, the primary mask 23 has a density of 1000 opaque bars per inch while the secondary mask portions 29 and 31 have a density of 1004 opaque bars per inch. In each of the primary and secondary counting masks the width of the slit or transparent bar is the same as the width of the opaque bar. Other types of code patterns may, of course, be used.

Light from light source 13 passes through the transparent bars or slits in the primary mask 12, thus forming an illuminated pattern. The light continues through the objective lens 16 which collimates this light; namely, the bundle of diverging rays from each point of the illuminated pattern is rendered parallel upon passing through the lens. This collimated beam is directed onto prism 11 and its reflecting faces 11a and 11b. The collimated beam is then reflected back through the lens 16 which converges the light to an image onto secondary mask 18. As is well konwn by those skilled in the art the effected of this superimposed mask will be to provide a moire pattern which will be sensed by detectors 19 and 21 behind secondary counting mask portions 29 and 31. Very small movements of shaft 10 and prism 11 will cause an extremely large movement of the moire pattern to provide an accurate measurement of the movement of shaft 10.

Similarly, the reference masks 24 and 32 include transparent bars or slits and opaque bars but with a random arrangement. The secondary reference mask portion 32 is a photographic negative of the primary reference mask 24. In operation when the primary reference mask 24 is exactly imaged on the secondary mask 32 the pattern of the opaque bars of the primary mask will completely cover the slits of the secondary mask so that no light will be visible behind the secondary reference mask 32. However, movement of one mask with respect to the other of, for example, only one thousandth of an inch will cause 25% of the light to be transmitted since now there is no correlation between the bar shading on the primary and the secondary reference masks. Such light is sensed by a photo-detector 20. The complete blanking out of light provides a reference pulse to indicate a fixed position of shaft 10.

Referring now specifically to FIGS. 4A, 4B and 4C, FIG. 4A illustrates how an object, shown as an upwardly pointing arrow, is reflected from face 11a to face 11b and inverted into an arrow designated image. FIGS. 4B and 4C illustrate the rotation capability of the prism by showing the effect of a 90° angular movement about the Z axis. FIGS. 5A, 5B and 5C illustrate an alternative embodiment where the same prism is mounted for rotation along a different axis designated Z' and where the image is reflected in the same direction rather than reflected back as shown in FIG. 4A. Such a prism is termed a Dove prism and would have use in applications where it is not desired to use a beam splitter 17 as shown in FIG. 1.

It is apparent from inspection of the object and image movement of FIGS. 4B and 4C that a single revolution of the prism will produce a double revolution of the image relative to the object.

FIG. 6 illustrates the coupling of detectors 19 and 21 in order to eliminate the effects of wobble or eccentricity in the shaft 10. Referring also to FIG. 3 if shaft 10 does cause a wobble about the prism Y axis (see FIG. 4B) this would have the effect of causing a counting error. However, this error can be canceled out since with respect to opposed mask portions 29 and 31 of FIG. 3 the error is respectively positive and negative. Thus, the addition of the signals from associated detectors 19 and 21 in adder 33 and division by 2 in a divider 34 provides the correct digital count of the angular incremental motion of shaft 10. This may be stored and counted by a counter 35.

Detector 20 adjacent the mask 32 provides a reference or zero position pulse which has been labeled reset. Thus, the digital output of counter 35 represents total angular movement of shaft 10.

Rotation of prism about its X axis has almost no effect on the returning light beam and thus produces no error.

OPERATION

Light from illumination source 13 causes a pattern to be projected by mask 12 which passes through beam splitter 17 and is collimated by lens 16. Thus, in essence, an infinite projection system is provided which minimizes any translational movement of the reflecting surfaces of prism 11. The reflected beam from prism 11 is diverted by beam splitter 17 to mask 18 and focused on the plane of that mask. Detectors 19, 20 and 21 located behind mask 18 receive the encoded signals and as discussed above provide an indication of the movement of shaft 10. The specific prism 11 used which is of the Porro type is an isosceles right triangular prism with a hypotenuse face which has the property that rotation of the shaft axis in one revolution will cause an image of mask 12 to be rotated at the plane of mask 18.

Because of the structural arrangement of the mask only a small portion of the rings 26 and 27 need be used for the mask since the primary mask 12 has a coded pattern around its entire extent.

Due to the manner in which the objective lens 16 is used in the system with the beam of light transversing it twice, it has the effect of a completely symmetrical lens system with equi-conjugate object and image surfaces. As is well known by those skilled in the art of lens design, such a lens system results in the automatic correction of certain aberrations; namely, coma, distortion and lateral color.

In addition to a Porro type prism, an Amici prism may also be used. Such rotating prisms are more fully discussed in chapter 13 of a military standardization handbook entitled Optical Design, dated Oct. 5, 1962, published by the Defense Supply Agency designated Mil-Hdbk–141.

As also discussed in the above handbook, arrangements of rigidly mounted mirrors may be used in place of a prism to also provide image rotation.

I claim:
1. Optical apparatus for sensing angular motion of a rotating object having a predetermined axis of rotation comprising, optical means of the image rotator type having a predetermined axis of rotation and adapted for coupling to said rotating object with both of said axes coincident, a primary mask having a predetermined code pattern spaced from and facing said optical means, illumination means for projecting said code pattern towards said optical means, a secondary mask having a predetermined code pattern and spaced from and facing said optical means so that the projected pattern of said primary mask is superimposed on said secondary mask pattern whereby a pattern is detectable behind said secondary mask, said patterns of said primary and secondary masks being arranged so that said detectable pattern is indicative of said angular motion of said rotating object.

2. Optical apparatus as in claim 1 where said primary mask is circular.

3. Optical apparatus as in claim 2 where said primary mask includes an annular ring having a first coded pattern for indicating incremental angular displacement of said rotating object and a concentric second coded pattern for providing at least one reference position for said rotating object.

4. Optical apparatus as in claim 1 where said secondary mask includes two identical portions spaced 180° from each other with respect to said coincident axes.

5. Optical apparatus as in claim 4 together with photodetector means behind said two identical portions and logic means for cancelling errors contained in the electrical signals from said detectors.

6. Optical apparatus as in claim 5 where said logic means includes an adder for adding such signals thereby canceling out said errors.

7. Optical apparatus as in claim 1 in which said optical means is of the 45°–90°–45° type.

8. Optical apparatus as in claim 7 in which said prism is used as a Porro prism.

9. Optical apparatus as in claim 1 in which said optical means reflects said pattern projected from said primary mask back towards said primary mask together with beam splitter means for diverting the reflected beam towards said secondary mask.

10. Optical apparatus as in claim 9 together with objective lens means intermediate said primary mask and said optical means whereby a symmetrical lens system is provided with said single objective lens.

11. Optical apparatus as in claim 1 together with lens means intermediate said primary mask and said optical means for collimating light from said mask, whereby an infinite projection system is provided.

References Cited

UNITED STATES PATENTS

| | | | |
|---|---|---|---|
| 2,788,519 | 4/1957 | Caldwell | 250—237 X |
| 2,938,378 | 5/1960 | Canada et al. | 356—169 X |
| 3,153,111 | 10/1964 | Barber et al. | 250—237 X |
| 3,175,093 | 3/1965 | De Lang | 250—237 |
| 3,244,063 | 4/1966 | Lawrence | 356—169 |

FOREIGN PATENTS 953,050    3/1964    Great Britain.

JAMES W. LAWRENCE, Primary Examiner

C. R. CAMPBELL, Assistant Examiner

U.S. Cl. X.R.

250—234, 236, 237; 356—152, 154, 169, 170